Jan. 10, 1956     C. A. LEVERTH, JR     2,729,911
FISH HOOK SPREADER
Filed July 15, 1953
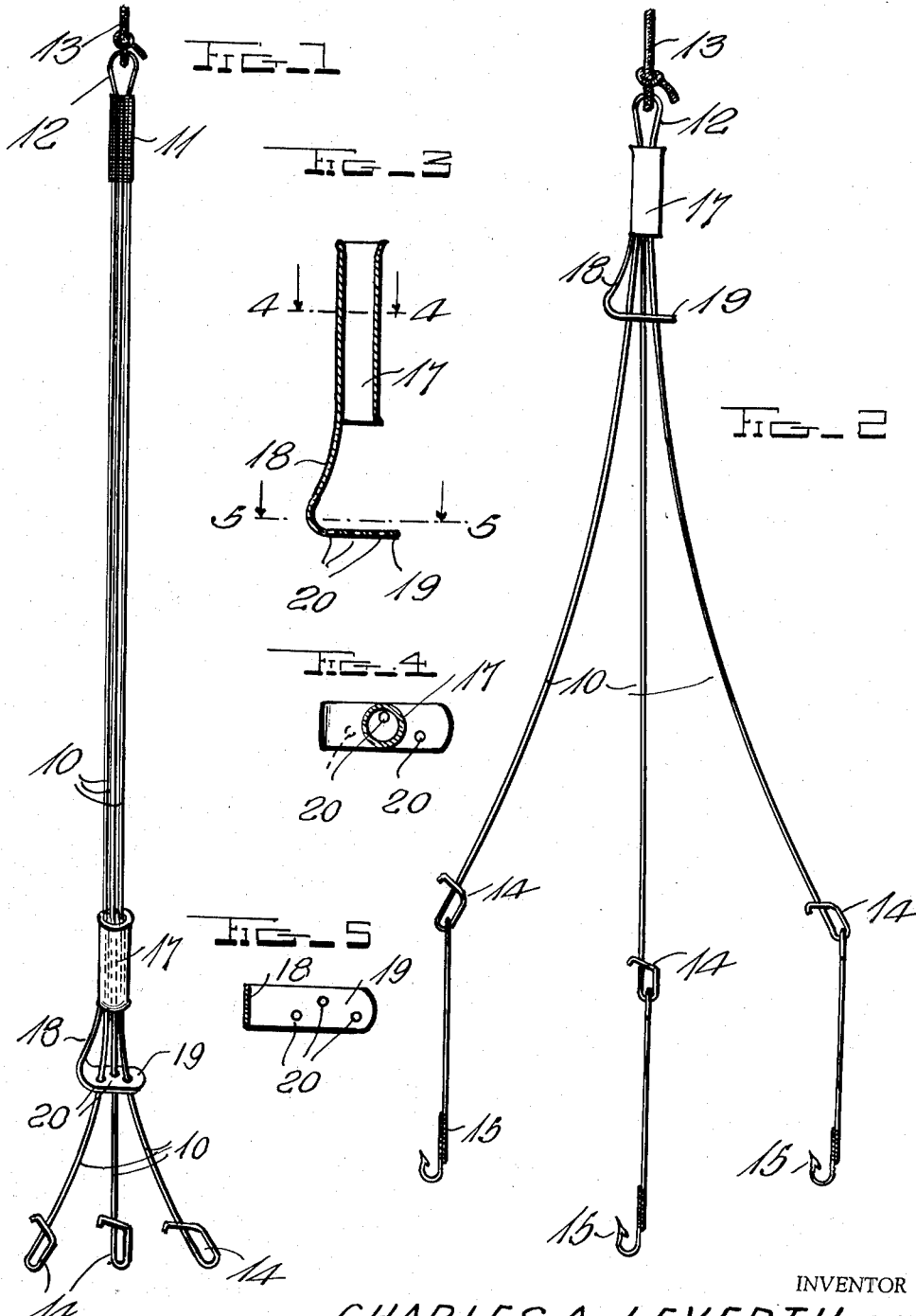
INVENTOR
CHARLES A. LEVERTH, JR.
BY Felix A. Russell
ATTORNEY

United States Patent Office 2,729,911
Patented Jan. 10, 1956

2,729,911

FISH HOOK SPREADER

Charles A. Leverth, Jr., Bedford, Ohio

Application July 15, 1953, Serial No. 368,138

1 Claim. (Cl. 43—42.74)

The present invention relates to a fishhook spreader and it consists in the combinations, constructions and arrangements of parts herein described and claimed.

Generally there is provided a device consisting of a plurality of spring wires soldered together at one of their ends and provided at such end with a loop whereby the same may be attached to a fish line. A sleeve is slidably mounted upon the wires all of which extend therethrough and a guide plate extends outwardly and laterally from the outer end of the sleeve and is provided with a plurality of spaced openings through each of which one of the wires is adapted to pass. The free ends of each of the wires is provided with means for attaching a conventional fishhook thereto. The device is such that by moving the sleeve and its attached guide plate toward the free ends of the wires, the latter are brought toward one another while moving the sleeve toward the soldered ends of the wires permits the wires to spread away from one another due to the placement of the openings in the guide plate. Such movement of the sleeve permits the fisherman to fish with a plurality of baits of identical or dissimilar types with such baits and their respective hooks close together or spaced appreciable distances apart, depending upon the type of fishing desired.

It is accordingly an object of the invention to provide a device of the character set forth which is simple in construction, inexpensive to manufacture and yet effective and efficient in use.

Another object of the invention is to provide, in a device of the character set forth, novel means for adjusting the distances from one another of a plurality of fishhook holding means forming a part of the invention.

Another object of the invention is the provision, in a device of the character set forth, of a novel sleeve and guide plate both forming parts of the invention.

Other and further objects of the invention will become apparent from a reading of the following specification taken in conjunction with the drawing, in which:

Figure 1 is a perspective view of an embodiment of the invention showing the same with certain hook-holding means adjacent one another, Figure 2 is a view similar to Figure 1 but showing the device with the hook holding means spread apart, Figure 3 is an enlarged vertical sectional view of a sleeve and guide plate forming part of the invention, Figure 4 is a sectional view taken along line 4—4 of Figure 3, and Figure 5 is a sectional view taken along line 5—5 of Figure 3.

Referring more particularly to the drawing, there is shown therein a plurality—in this case three—of elongated outwardly biased spring wires 10 the inner ends of which are soldered and/or otherwise affixed together, as indicated at 11. Projecting from the inner ends of the thus mutually bound wires 11 is a loop member 12 to which may be attached a conventional fishing line 13.

The outer end of each of the wires 10 is looped upon itself, as indicated at 14, whereby a fishhook 15 may be attached to the outer end of each of the wires. A cylindrical sleeve 17 closely encircles the wires 10 and has integrally formed with the outer end thereof an outwardly extending arm 18 which has, in turn, integrally connected to its outer end a laterally extending guide plate 19 having extending therethrough openings 20 each for the reception therethrough of one of the wires 10, it being apparent that the openings 20 are spaced from one another and that further the openings 20 are disposed over an area greater than the cross sectional area of the interior of the sleeve 17.

In operation, it will be apparent that when a fisherman desires to have the wires or leaders 10 spread apart as shown in Figure 2, particularly in "bottom fishing" that it is only necessary for him to grasp the sleeve 17 and move the same inwardly toward the loop 12 and that such action will cause the guide plate, through its openings 20, to guide the outwardly biased spring wires 10 apart, consequently moving the hooks 15 and the baits which may be placed thereon likewise away from one another. On the other hand, when it is desired to bring the hooks 15 and their baits toward one another or into a group occupying a minimum space whereby to offer greater attraction to a single fish, it is only necessary to move the sleeve 17 and its attached guide plate 19 toward the loops 14 in the manner illustrated in Figure 1, this action, of course, forcing the wires 10 toward one another.

While but one form of the invention has been shown and described herein, it will be readily apparent to those skilled in the art that many minor modifications may be made without departing from the spirit of the invention or the scope of the appended claim.

What is claimed is:

A device of the character described comprising a multiplicity of leaders connected together at one of their ends, means for attaching a fishhook to the other end of each of said leaders, and means for selectively spacing the said other ends one from another, said last-mentioned means comprising a cylindrical sleeve closely surrounding all of said leaders and slidable thereon, said sleeve having a portion of the side wall extended, and a guide plate carried by the free end of the extended portion of said sleeve and having openings each for the passage therethrough of one of said leaders, said plate being disposed in a plane normal to the longitudinal axis of the sleeve, said leaders being formed of spring wire and outwardly biased from one another.

References Cited in the file of this patent

UNITED STATES PATENTS

| | | |
|---|---|---|
| 811,555 | Freel | Feb. 6, 1906 |
| 847,839 | Smith | Mar. 19, 1907 |
| 955,219 | Spinney | Apr. 19, 1910 |
| 1,046,302 | Jass | Dec. 3, 1912 |
| 1,319,859 | Feckley | Oct. 28, 1919 |
| 1,542,942 | Jacobson | June 23, 1925 |
| 2,162,739 | Mindek | June 20, 1939 |
| 2,249,727 | Butler | July 22, 1941 |
| 2,683,324 | Engelman | July 13, 1954 |

FOREIGN PATENTS

| | | |
|---|---|---|
| 402,355 | France | 1909 |